United States Patent Office 3,481,901
Patented Dec. 2, 1969

3,481,901
THERMOPLASTIC SOLUBLE POLYMER OF (1) AN ORTHO-ORTHO ALKYLIDENE BRIDGED NOVO-LAK AND (2) A DIFUNCTIONAL HALOGEN MATERIAL
Robert J. Prochaska, Glendale, Mass., assignor to General Electric Company, a corporation of New York
No Drawing. Continuation-in-part of application Ser. No. 241,131, Nov. 30, 1962. This application Mar. 1, 1967, Ser. No. 619,570
Int. Cl. C08g *37/08*
U.S. Cl. 260—49         12 Claims

ABSTRACT OF THE DISCLOSURE

A thermoplastic soluble polymer of (1) an ortho-ortho alkylidene bridged phenolformaldehyde novolac resin and (2) a halogen containing difunctional material such as phosgene. Also included herein is a thermoset composition wherein the thermoplastic polymer is advanced to an infusible state by heating the thermoplastic polymer in the presence of an alkali catalyst such as sodium hydroxide.

This application is a continuation-in-part of application Ser. No. 241,131 filed Nov. 30, 1962, now abondoned.

This invention relates to phenolic condensation products and more particularly is concerned with a new class of thermoplastic soluble polymers prepared by interacting a suitable phenolaldehyde novolac resin with a highly reactive, halogen containing, difunctional material capable of condensing with the phenol-aldehyde novolac resin.

The products of the acid catalyzed reaction of a phenol with an aldehyde are well known in the plastics art, having been first designated as "novolacs" by Baekland in 1912. Novolac resins may be defined as initially soluble, thermoplastic phenol ended chain polymers capable of reacting further, or thermosetting, under appropriate conditions to provide insoluble, infusible resinous materials. Most of the commercially available novolac resins are prepared by condensing phenol with formaldehyde. Since the former is reactive toward the latter at three points (the two ortho positions and the para position), the resulting novolac polymer consists of phenolic nuclei interconnected by methylene bridges attached in a random manner ortho and para relative to the phenolic hydroxyl groups. I refer to this type of novolac polymer, i.e., one containing random ortho and para alkylidene bridging as a "conventional novolac polymer."

In the event the phenol employed in the aldehyde condensation reaction is replaced with a phenolic compound having its para position blocked, such as p-cresol, for example, the condensation reaction may proceed in only one direction to yield a novolac polymer having all of the alkylidene bridges attached ortho relative to the phenolic hydroxyl groups. This type of polymer, which I hereby refer to as "ortho-ortho" novolac is not readily curable with the conventional novolac curing materials and has, therefore, achieved only limited importance in the phenolics industry.

In the past, novolac polymers have been condensed with difunctional materials capable of condensing with phenolic hydroxyl groups but these provide insoluble and infusible resins having properties somewhat analogous to those of the cured novolac polymers. For example, the use of novolac resins in alkyd type formulations in which phenol-formaldehyde resins are condensed with diethyl phthalate is described in U.S. Patent 1,592,082, whereas the preparation of infusible, thermoset materials by the reaction of a novolac with dibasic acids such as phthalic, maleic, fumaric, malic, succinic and tartaric acids is disclosed in U.S. Patent 1,702,052. The thermoset reaction products obtained by condensing a novolac resin with glycerin and phthalic acid are described in U.S. Patents 2,374,813 and 2,374,814, while U.S. Patent 1,697,713 discloses the production of a highly insoluble material by reacting phosgene with a conventional novolac resin. Russian Patent 51,730 discloses infusible formulations prepared by etherifying novolac polymers with polyatomic alcohols and subsequently condensing the etherified materials with polybasic acids.

As far as I am aware, thermopastic, soluble polymers which are the products of the reaction of an ortho-ortho alkylidene bridged phenol-aldehyde novolac resin and a highly reactive halogen containing difunctional material capable of condensing with phenolic hydroxyl groups have heretofore not been prepared. Unexpectedly, I have discovered that when ortho-ortho alkylidene bridged phenol-aldehyde novolac polymers are condensed with certain highly reactive halogen containing difunctional materials, a new class of thermoplastic, soluble polymers are prepared which are high melting materials having a variety of applications in the plastics industry. On the other hand, the reaction of a conventional novolac polymer with such difunctional reactants results in the production of the expected insoluble, infusible thermoset materials.

Briefly stated, the new thermoplastic, soluble polymers of my invention may be prepared by contacting, under reactive conditions, (1) an ortho-ortho alkylidene bridged phenol-aldehyde novolac polymer and (2) a difunctional material selected from the class consisting of (a) a carbonyl halide; (b) a dicarboxylic acid halide; (c) a thionyl halide; (d) a bishaloformate; and (e) a dihalosilane.

The ortho-ortho alkylidene bridged novolac polymers useful in the practice of my invention may be more simply defined as novolac polymers consisting essentially of recurring structural units of the formula (1)  

where A is an aromatic radical such as phenyl, diphenyl, naphthyl, tolyl, xylyl, ethylphenyl; R is an alkylidene group of 1–4 carbon atoms attached to A ortho relative to the hydroxyl group, such as methylene, ethylidene, propylidene, butylidene; $R_1$ is an alkyl radical of 1–8 carbon atoms such as methyl, ethyl, isopropyl, t-butyl or can be selected from the same group of radicals as A, and is attached to A para relative to the hydroxyl group; and $n$ is a whole number from 0 to 1.

Generally speaking, the ortho-ortho alkylidene bridged phenol-aldehyde novolac polymers falling within the scope of Formula I may be prepared by condensing a phenol having its para position blocked by either an alkyl or an aryl radical, with an aldehyde under standard novolac producing conditions.

Novolac polymers having repeating structural units of the formula

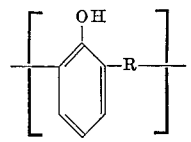

i.e., where $n$ is zero in Formula I above, may be prepared, for example, by employing a p-halogen phenol in the standard novolac producing reaction, and subsequently removing the halogen from the para position by any of the well known reduction techniques.

A particularly preferred class of novolac polymers falling within the scope of Formula I contain recurring structural units of the formula

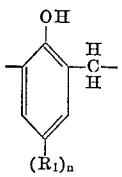

where $R_1$ and $n$ have the meanings given above.

The phenol used for preparing the ortho-ortho novolacs utilized in the present invention may be any phenol in which the sole reactive group is the phenolic hydroxyl group and in which the two ortho positions of the aromatic nucleus to which the hydroxyl group is attached are reactive in the condensation with an aldehyde.

Similarly, any substituted or unsubstituted aldehyde in which the sole reactive group is the carbonyl group may be employed to provide ortho-ortho novolac polymers used in the practice of the invention. Among the aldehydes which may be used are, for instance, formaldehyde, acetaldehyde, benzaldehyde and butyraldehyde. Other phenols and aldehydes which may be employed to provide such novolac polymers will readily occur to those skilled in the art.

The carbonyl halide which may be used to provide the thermoplastic polymers of the invention will generally conform to the formula

where Y is a halogen atom such as chlorine or bromine, for example. Generally speaking, phosgene is preferred due to its availability and low cost.

Any diacid halide in which the acid halo groups are the sole reactive groups may be employed to provide the soluble polymers of the invention. Such diacid halides generally conform to the formula

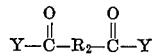

where $R_2$ is selected from the group consisting of aliphatic radicals such as methylene, ethylene, propylene, isopropylene, butylene; and aromatic radicals such as phenylene, diphenylene, naphthylene, xylylene and tolylene; and Y is a halogen atom. Specific examples of diacid halides falling within the scope of the above formula are terephthaloyl chloride, adipyl chloride and isophthaloyl chloride.

Any thionyl halide falling within the scope of the formula

where Y is a halogen atom such as chlorine or bromine, for example, may be used to provide the soluble polymers of the invention. In general, thionyl chloride is preferred.

Similarly, any bishaloformate in which the haloformate groups are the sole reactive groups may be employed to provide the soluble polymers of the invention. In general, such haloformates will conform to the formula

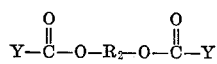

where $R_2$ and Y have the meanings given above. Specific examples of bishaloformates falling within the scope of the above formula are ethylene bischloroformate, phenylene bischloroformate, tolylene bischloroformate, propylene bischloroformate, diethylene ether bischloroformate and the bischloroformate of 2,2 bis(4-hydroxylphenyl)propane.

In general, any dihalosilane in which the halogen groups are the sole reactive groups may be employed to provide the polymers of the invention. Such dihalosilanes will generally fall within the scope of the formula

in which Y and $R_2$ have the meanings given above, and $R_3$ is selected from the same group of radicals as $R_2$. Specific examples of dihalosilanes which may be employed are diphenyl dichlorosilane, dimethyl dichlorosilane and phenylmethyl dichlorosilane.

The amount of difunctional material reacted with an ortho-ortho polymer to provide the thermoplastic soluble polymers of the invention may vary within wide limits. In order to assure complete condensation, sufficient difunctional material to completely react with all available phenolic hydroxyl groups in the novolac polymer should be employed. However, soluble polymers having properties differing from the parent novolac polymer may be provided by condensing as low as 0.05 part of the molar quantity of the difunctional material needed to react with all available phenolic hydroxyl groups in the ortho-ortho novolac polymer.

Generally speaking, the reaction of the difunctional halogen containing material with the ortho-ortho novolac polymer may be conducted in a common organic solvent for the reactants which is inert in the sense that it does not enter into the reaction. Examples of such solvents are benzene, xylene, methylene chloride, ethylene chloride, propylene dichloride, chlorobenzene, toluene, carbon tetrachloride, chloroform and diethyl ether. Although the quantity of solvent employed may vary within wide limits, it has been discovered that higher yields of the desired polymeric material may be obtained when the weight ratio of the ortho-ortho novolac (initially charged to the reaction mixture) to solvent is less than 0.2 and preferably less than 0.1.

The reaction may be successfully consummated at temperatures ranging from below about $-10°$ C. to above $95°$ C. However, higher yields of the desired soluble polymer may be obtained by maintaining the temperature of reaction below the reflux temperature (at atmospheric pressure) of the reaction mixture, and preferably below $45°$ C.

Since the difunctional material employed in the reaction contains a halogen group at the point of functionality, it may be preferable to conduct the reaction in the presence of an acid acceptor such as a tertiary amine. Examples of suitable tertiary amines are the aliphatic tertiary amines such as, for example, trimethylamine; triethylamine; tripropylamine, as well as the aromatic tertiary amines such as triphenylamine; N,N-dimethylaniline; and N,N-dimethyl-p-nitroaniline. Included also are the heterocyclic tertiary amines such as, for example, pyridine; picoline; pyridazine; pyrimidine; pyrazine; quinoline; and isoquinoline. Mixtures of two or more such tertiary amines may also be used.

In many instances the tertiary amine employed may act as a solvent for the reactants, as in the case of pyridine, for example. In the event the amine does not act in this capacity, the required amount of one of the inert organic solvents mentioned above may be employed.

I have also discovered that the thermoplastic soluble polymers of the instant invention may be cross-linked to provide infusible thermoset materials by heating the thermoplastic polymers of this invention in the presence of a particular catalytic amount of a catalyst selected from the group consisting of alkali metals such as sodium, potassium, rubidium, cesium; alkali metal hydroxides, such as sodium hydroxide, potassium hydroxide; alkali metal carbonates, such as sodium carbonate, potassium carbonates; alkali metal alkoxides, such as sodium methoxides, potassium ethoxide; alkali metal aryloxides, such as sodium phenate, potassium bisphenate; quaternary ammonium hydroxides, such as tetramethylammonium hydroxides, cetyl triethylammonium hydroxides, tetraheptyl ammonium hydroxide, tetraethylammonium hydroxides. Mixtures of the above catalysts can also be employed.

The time necessary to cure the soluble polymers to provide thermoset materials in the presence of one or more of the above curing catalysts will vary with the temperature, the particular thermoplastic soluble polymer employed, and the type and amount of catalyst used. In general, heating for a period of from a few seconds to a few minutes will suffice. Preferably a temperature of at least 100° C. is employed to advance the polymer to an infusible state.

The catalytic amount (i.e., the amount sufficient to initiate cross-linking) of catalyst used may also vary within a wide range, depending upon the temperature of reaction and the particular polymer which is to be cross-linked. Satisfactory results have been obtained by employing as little as 0.001 percent by weight of the catalyst, based upon the weight of the polymer to be cross-linked. Generally, however, amounts varying from 0.01 percent to about 3.0 percent by weight are advantageously used. Although the catalyst may be added in amounts greater than 3.0 percent, such addition is not necessary nor practical since it tends to contaminate the resin product which is obtained.

In order that those skilled in the art may better understand how the present invention may be practiced, the following examples are given by way of illustration and not by way of limitation. All parts and percentages are by weight unless otherwise noted.

EXAMPLE I

A series of reactions were performed using an ortho-ortho bridged novolac, designated PE–100, using about 0.7 formaldehyde to p-cresol mole ratio. In each case, one hundred parts of the powdered PE–100 were dissolved in the reaction solvent and phosgene gas bubbled through the stirred solution at a constant rate (0.72 part per minute) until a large excess had been added. The excess phosgene was removed with water, and the reaction mixture washed with dilute hydrochloric acid and water to remove pyridine and pyridine hydrochloride. The reaction product was precipitated in a Waring blendor with a large volume of methyl alcohol. The all-pyridine reaction mixture was precipitated directly with methyl alcohol without prior washing. The resultant precipitated solids were filtered and dried. Details of these reactions are listed in Table I.

TABLE I

| Novolac | Pyridine | CH$_2$Cl$_2$ | Product Melting Range | Appearance |
|---|---|---|---|---|
| 100 parts | 600 parts | | 150° C.–200° C. | White powder. |
| Do | 160 parts | 500 parts | 150° C.–200° C. | Do. |
| Do | do | 1,500 parts | 150° C.–200° C. | Do. |

A melting range is reported since the powders melted over a broad temperature range to clear, light colored, free flowing viscous liquids. These powdered products were soluble in methylene chloride.

EXAMPLE II

The melting range of the novolac carbonate can be adjusted by selection of a suitable novolac. For example, a low melting novolac carbonate was obtained from an ortho-ortho bridged novolac made using about 0.75 paraform to p-octyl phenol mole ratio. One hundred parts of the powdered, low melting p-octyl phenol novolac were dissolved in 600 parts of methylene chloride and 160 parts of pyridine. Phosgene gas was bubbled through the stirred solution at a constant rate (0.75 part per minute) until an excess had been added. The excess phosgene was removed with water and the reaction mixture washed with dilute hydrochloric acid and water to remove pyridine and pyridine hydrochloride. The reaction product was precipitated in a Waring blendor with a large volume of methyl alcohol. After drying, the precipitated solid was still soluble in methylene chloride and formed clear, free flowing melts in the 100° C.–150° C. range.

EXAMPLE III

Fifty parts of an ortho-ortho bridged novolac [prepared by condensing less than 1 mole of formaldehyde per mole of a mixture of p-cresol (80 parts) and p-t-butyl phenol (20 parts)] were dissolved in 500 parts of methylene chloride and 56 parts of pyridine. Phosgene gas was bubbled through the stirred solution at a constant rate (0.44 part per minute) until an excess had been added. The excess phosgene was removed with water and the phosgenated novolac precipitated directly with methyl alcohol in a Waring blendor. The dried product melted to a clear, free flowing liquid and remained soluble in methylene chloride.

EXAMPLE IV

One hundred parts of an ortho-ortho novolac having the repeating units

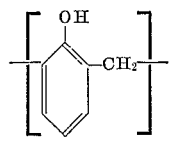

were dissolved in 1,000 parts of methylene chloride and 160 parts of pyridine. The same phosgenation procedure and workup described in Example II were used to yield a dry white powder, soluble in methylene chloride and fusing at 180° C–200° C.

EXAMPLE V

When a small portion of a phosgenated ortho-ortho novolac obtained from Example I was placed on a hot plate maintained at 400° F.–425° F., it melted to a clear, free-flowing melt with no evidence of gel formation. When anhydrous potassium carbonate (2% by weight) was added to the clear melt and stroked into the mixture, rapid viscosity buildup was noted and a soft stroke cure was accomplished in 90 seconds. The stroke cured product was no longer soluble in methylene chloride. When solid sodium hydroxide or potassium hydroxide was used in place of potassium carbonate, the stroke cure was complete in 10 seconds.

EXAMPLE VI

Thitry parts of the pure crystalline trisphenol, melting point 212° C.–213° C.

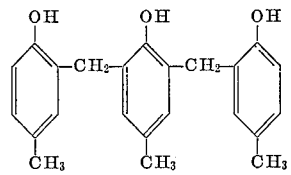

prepared by reacting one part formaldehyde with three parts p-cresol, were dissolved in 600 parts methylene chloride and 26 parts pyridine. Thirteen parts of phosgene gas were bubbled into the stirred solution over a 65-minute period. The excess phosgene was removed with water and the reaction mixture was washed thoroughly with dilute hydrochloric acid and water. After evaporating most of the methylene chloride, the reaction product was precipitated with heptane to yield a fine white powder having a broad melting range, 60° C.–125° C. On infrared analysis, this product had a strong absorption in the carbonate region and showed no absorption in the hydroxyl region. It melted to a free flowing liquid and was converted to an insoluble gel at 150° C. on the addition of potassium carbonate. When the solid was dissolved in chlorobenzene at 120° C.– 130° C., it was converted to a gel on the addition of a minute quantity of potassium hydroxide.

EXAMPLE VII

Ten parts of an ortho-ortho novolac from a 0.8 mole ratio p-cresol to formaldehyde, designated PE–1000, were dissolved in 100 parts methylene chloride and 13 parts pyridine. Eight parts of adipyl chloride were added dropwise to the stirred solution. When the addition was completed, the reaction mixture was precipitated directly in methyl alcohol to yield a white solid, soluble in methylene chloride, melting range 120° C.–150° C.

When heated with anhydrous potassium carbonate (2% by weight), the polymer was converted to a gel insoluble in methylene chloride.

EXAMPLE VIII

Fifty parts of PE–1000 were dissolved in 300 parts of pyridine and 45 parts of terephthaloyl chloride dissolved in methylene chloride added to the stirred solution. The reaction mixture was precipitated directly in a Waring Blendor to yield a fine white powder which was soluble in dioxane.

EXAMPLE IX

Fifty parts of PE–1000 were dissolved in 500 parts methylene chloride and 48 parts pyridine. Fifty-nine parts of diethylene ether bischloroformate were added dropwise to the stirred solution. After the addition was complete, the reaction mixture was precipitated with methanol to yield a white powder which was completely soluble in methylene chloride and which fused at 120° C.–150° C.

EXAMPLE X

Ten parts of PE–1000 were dissolved in 100 parts methylene chloride and 13 parts pyridine. Six parts dimethyldichlorosilane were added dropwise to the stirred reaction mixture. After the addition was complete, the reaction mixture was precipitated in methyl alcohol to yield a white solid which was soluble in methylene chloride, melting range 130°–150° C.

EXAMPLE XI

Ten parts of PE–1000 were dissolved in 100 parts methylene chloride and 13 parts pyridine. Five parts thionyl chloride were added dropwise to the stirred solution. After the addition was complete, the reaction mixture was precipitated in methyl alcohol to yield a solid which was soluble in methylene chloride, melting range 170° C.–200° C.

EXAMPLE XII

Fifty parts of a conventional novolac (random ortho-para bridging) were dissolved in 500 parts of methylene chloride and 80 parts of pyridine. Phosgene gas was bubbled into the stirred solution and gel formation was noted almost immediately. As more phosgene was added, more gel was produced.

EXAMPLE XIII

The previous example was repeated using a novolac prepared from o-cresol and formaldehyde. Gel formation was noted in this case also.

EXAMPLE XIV

The previous example was repeated using a novolac prepared from a commercial mixture of meta-para cresol and formaldehyde. Gel formation occurred in this case also.

EXAMPLE XV

Examples VII through XI were repeated using the conventional novolac in place of the ortho-ortho novolac. The same quantities and procedures were used for each example and in every case gelation occurred very shortly after the first addition of the highly reactive difunctional reactant.

The thermoplastic soluble polymers of the instant invention may be employed in the manufacture of coatings and impregnants for paper, textile and leather, as well as in paints, varnishes, adhesives and rubber. In combination with fillers such as woodflour, cotton flock and glass fiber, the polymers of the invention find utility as thermosetting molding compounds. The thermoset compositions prepared from the thermoplastic soluble polymers of the instant invention find utility as resinous binders for sand (foundry resins), abestos (brake bands), Carborundum (grinding wheels) and paper (oil filters).

What is claimed is:

1. A thermoplastic soluble polymer consisting essentially of the reaction product of (1) an ortho-ortho alkylidene bridged phenol-aldehyde novolac resin having the structural formula

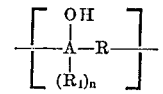

wherein A is an aromatic radical, R is an alkylidene group of 1–4 carbon atoms ortho relative to the hydroxyl group, $R_1$ is an alkyl radical of 1–8 carbon atoms and para relative to the hydroxyl group and $n$ is an integer of 0 to 1, and (2) a halogen containing difunctional material having a halogen group at the point of functionality selected from the group consisting of (a) a carbonyl halide,
(b) a dicarboxylic acid halide,
(c) a thionyl halide,
(d) a bishaloformate, and
(e) a dihalosilane.

2. The composition of claim 1 in which the carbonyl halide is phosgene.

3. The composition of claim 1 in which the dicarboxylic acid halide is adipyl chloride.

4. The composition of claim 1 in which the thionyl halide is thionyl chloride.

5. The composition of claim 1 in which the bishaloformate is diethylene ether bischloroformate.

6. The composition of claim 1 in which the dihalosilane is dimethyldichlorosilane.

7. The composition of claim 1 in which the ortho-ortho alkylidene bridged phenol aldehyde novolac resin is essentially

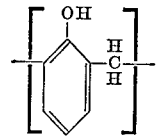

8. The composition of claim 1 in which the ortho-ortho alkylidene bridged novolac resin is essentially

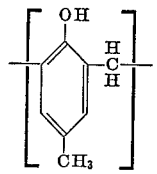

9. A thermoset infusible polymer prepared by exposing to elevated temperatures the thermoplastic polymer of claim 1 in the presence of a minor amount of a catalyst selected from the group consisting of the alkali metals, alkali metal hydroxides, alkali metal carbonates, alkali metal alkoxides, alkali metal aryloxides and quaternary ammonium hydroxides, and mixtures thereof.

10. The thermoset infusible polymer of claim 9 wherein the catalyst is sodium hydroxide.

11. The thermoset infusible polymer of claim 9 wherein the amount of catalyst present is about 0.01 to about 3.0 weight percent based on the weight of the thermoplastic polymer.

12. The thermoset infusible polymer of claim 9 wherein the temperature is at least 100° C.

References Cited

UNITED STATES PATENTS

| | | | |
|---|---|---|---|
| 1,697,713 | 1/1929 | Bucherep | 260—49 |
| 2,950,266 | 8/1960 | Goldblum | 161—183 |
| 3,014,891 | 12/1961 | Goldblum | 260—47 |
| 3,035,020 | 5/1962 | Fry | 260—47 |
| 3,248,368 | 4/1966 | Biefeld | 260—57 |
| 2,950,266 | 8/1960 | Goldblum | 260—43 |

FOREIGN PATENTS 843,881   8/1960   Great Britain.

WILLIAM H. SHORT, Primary Examiner

H. SCHAIN, Assistant Examiner

U.S. Cl. X.R.

260—2, 17.2, 38, 51, 53, 59